United States Patent
Deakin

(10) Patent No.: US 12,320,335 B2
(45) Date of Patent: Jun. 3, 2025

(54) SEALING SYSTEM

(71) Applicant: Punch Flybrid Limited, Silverstone (GB)

(72) Inventor: Andrew Deakin, Silverstone (GB)

(73) Assignee: PUNCH FLYBRID LIMITED, Silverstone (GB)

(*) Notice: Subject to any disclaimer, the term of this patent is extended or adjusted under 35 U.S.C. 154(b) by 20 days.

(21) Appl. No.: 18/552,644

(22) PCT Filed: Mar. 29, 2022

(86) PCT No.: PCT/GB2022/050777
§ 371 (c)(1),
(2) Date: Sep. 26, 2023

(87) PCT Pub. No.: WO2022/208067
PCT Pub. Date: Oct. 6, 2022

(65) Prior Publication Data
US 2024/0369043 A1    Nov. 7, 2024

(30) Foreign Application Priority Data
Mar. 30, 2021 (GB) ...................... 2104489

(51) Int. Cl.
*F03G 3/08* (2006.01)
*F16H 33/02* (2006.01)
(Continued)

(52) U.S. Cl.
CPC ............... *F03G 3/08* (2013.01); *F16H 33/02* (2013.01); *F16H 57/021* (2013.01);
(Continued)

(58) Field of Classification Search
CPC .......... F03G 3/08; F16H 33/02; F16H 57/021; F16H 57/0412; F16H 57/0435;
(Continued)

(56) References Cited

U.S. PATENT DOCUMENTS

2024/0183425 A1* 6/2024 Deakin ............... F16C 39/00

FOREIGN PATENT DOCUMENTS

| CN | 202156308 U | 3/2012 |
|----|-------------|--------|
| EP | 2411697     | 2/2012 |

(Continued)

OTHER PUBLICATIONS

De Martino, Marcello: International Search Report: Oct. 5, 2022; 2 pages; Rijswijk.
Gupte, Rahul; Examination Report; Aug. 17, 2021; 6 pages.

*Primary Examiner* — Terence Boes
(74) *Attorney, Agent, or Firm* — STETINA GARRED BRUCKER & NEWBOLES

(57) ABSTRACT

An apparatus comprising: a flywheel mounted on a flywheel shaft; a bearing arrangement on which the flywheel shaft is supported; a gearing arrangement for torque coupling the flywheel to a drive member; a sealing arrangement; and a housing for containing the flywheel, bearing and gearing arrangements, the gearing arrangement being arranged to be in torque transmitting engagement with the flywheel, via the flywheel shaft, and having an engagement means for being in torque transmitting engagement with the drive member, the sealing arrangement comprising a pair of seals, defining a cavity, and forming a hermetic seal, between the engagement means and the housing, whereby, in use, a first pressure is maintained within the housing that is lower than a second pressure outside of the housing, and the seals retain a fluid within the cavity, and maintain the fluid at an intermediate pressure between the first and the second pressure.

15 Claims, 4 Drawing Sheets

(51) Int. Cl.
  *F16H 57/02*  (2012.01)
  *F16H 57/021* (2012.01)
  *F16H 57/04*  (2010.01)
  *F16J 15/06*  (2006.01)

(52) U.S. Cl.
  CPC ..... *F16H 57/0412* (2013.01); *F16H 57/0435* (2013.01); *F16H 57/0436* (2013.01); *F16H 57/0472* (2013.01); *F16H 57/0495* (2013.01); *F16J 15/06* (2013.01); *F16H 2057/02034* (2013.01); *F16H 2057/02043* (2013.01); *F16H 57/0471* (2013.01)

(58) Field of Classification Search
  CPC ............. F16H 57/0436; F16H 57/0472; F16H 57/0495; F16H 57/0471; F16H 2057/02034; F16H 2057/02043; F16J 15/06
  See application file for complete search history.

(56) References Cited

FOREIGN PATENT DOCUMENTS

| | | |
|---|---|---|
| EP | 3056736 | 7/2016 |
| GB | 2535794 A | 8/2016 |
| GB | 2587373 | 3/2021 |
| WO | 2010109208 | 9/2010 |
| WO | 2014020593 | 2/2014 |

* cited by examiner

SEALING SYSTEM

CROSS-REFERENCE TO RELATED APPLICATIONS

The present application claims priority to PCT International Patent Application No. PCT/GB2022/050777, filed Mar. 29, 2022, and Great Britain Patent Application No. 2104489.6, filed on Mar. 30, 2021, the disclosures of which are incorporated herein by reference.

STATEMENT RE: FEDERALLY SPONSORED RESEARCH/DEVELOPMENT

Not Applicable

BACKGROUND

This invention relates to a sealing system.

Background of the Invention

A flywheel for energy storage and recovery is typically mounted on a shaft in a housing such that the flywheel and the shaft move substantially together. The shaft is mounted on the housing via a bearing arrangement which allows the shaft (and thus the flywheel) to rotate relative to the housing. Kinetic energy can be stored in the flywheel by increasing the flywheel's speed of rotation. Energy can be recovered from the flywheel by transferring the flywheel's rotational energy to another entity, such as a vehicle drive shaft.

A flywheel which rotates at high speeds (e.g. speeds in excess of 10,000 rpm or 20,000 rpm) experiences large air resistance (or 'windage') forces, because of the high tip speed of the flywheel. This leads to loss of kinetic energy from the flywheel. To reduce such losses, a vacuum pump may be used to at least partially evacuate a chamber within the housing, the flywheel being positioned within the chamber. Evacuating the chamber lowers the pressure within the chamber, optimally to approximately a vacuum level, meaning that the flywheel experiences less air resistance as it rotates in the chamber.

The shaft may couple a transmission to the flywheel, whereby the transmission is typically provided outside of the chamber. At high rotational speeds of the flywheel, both the shaft and gearing elements of the transmission may be commensurately rotating at high speed and experience moderate windage forces leading to kinetic energy losses in both the shaft and gearing elements, and thus of the flywheel inside the chamber. This windage loss reduces the kinetic energy available to transfer between the flywheel and transmission—as windage loss increases, the overall efficiency decreases.

Further, forming a seal between the high-speed shaft and chamber is often complex and difficult to achieve and due to the high rotational speeds can result in higher than ideal losses. An additional sealing arrangement is also required to form a second seal between the shaft and the transmission. Having several sealing arrangements may require several lubricant systems, providing sealing fluid to the sealing arrangements, which can result, overall, in a more complex system design. The requirement for several sealing arrangements can also result in increased sealing losses, with respect to a system having less sealing arrangements.

The present invention aims to overcome or at least ameliorate one or more of the problems set out above.

SUMMARY OF THE INVENTION

In a first aspect of the invention, there is provided An apparatus comprising: a flywheel mounted on a flywheel shaft; a bearing arrangement on which the flywheel shaft is supported; a gearing arrangement for torque coupling the flywheel to a drive member; a sealing arrangement; and a housing for containing the flywheel, bearing and gearing arrangements, the gearing arrangement being arranged to be in torque transmitting engagement with the flywheel, via the flywheel shaft, and having an engagement means for being in torque transmitting engagement with the drive member, the sealing arrangement comprising a pair of seals, defining a cavity, and being arranged to form a hermetic seal, between the engagement means and the housing, hermetically sealing the housing, whereby, in use, a first pressure is maintained within the housing that is lower than a second pressure outside of the housing, and the seals are configured to retain a fluid within the cavity, and are arranged to maintain the fluid at an intermediate pressure between the first and the second pressure.

In a second aspect of the invention, there is provided an apparatus comprising: a flywheel mounted on a flywheel shaft; a bearing arrangement on which the flywheel shaft is supported; a gearing arrangement for torque coupling the flywheel to a drive member; a sealing arrangement; and a housing for containing the flywheel, bearing and gearing arrangements, the gearing arrangement being arranged to be in torque transmitting engagement with the flywheel, via the flywheel shaft, and having an engagement means for being in torque transmitting engagement with the drive member, the sealing arrangement comprising a pair of seals, defining a cavity, and being arranged to form a hermetic seal, between the engagement means and the housing, hermetically sealing the housing, whereby, in use, a first pressure is maintained within the housing that is lower than a second pressure outside of the housing, and the seals are configured to retain a fluid within the cavity, and are arranged to maintain the fluid at a pressure above the second pressure.

Preferably, the engagement means is a gear shaft supported by a second bearing arrangement and arranged to be in torque transmitting engagement with the gearing arrangement.

Preferably, the seals and the cavity extend circumferentially around the gear shaft. In this way, the seals and cavity encircle the shaft.

Preferably, a pump circulates lubricant, from a lubricant supply, to the gearing and bearing arrangements and is driven directly by the gearing arrangement, the flywheel or an electric motor. Integrating the pump within the chamber such that it is driven directly from either the gearing arrangement or the flywheel allows for a more compact and relatively less complex system design.

Preferably, the lubricant pressure at the outlet of the pump is maintained within a pre-determined range above the first pressure. In this way, a consistent flow of lubricant is delivered to the bearing and gearing arrangements over a wide range of operating speeds of the gearing arrangement and flywheel.

Preferably, the lubricant pressure at the inlet of the pump is maximised using a direct path from the lubricant supply to the inlet of the pump. In this way, any potential pressure drop that might occur to the inlet of the pump, due to a partial vacuum and/or partial blockage at the inlet, is mitigated, decreasing the likelihood of cavitation of the pump.

Preferably, an excess flow of lubricant is arranged to be released to ensure the maximum pressure of the pre-determined range is not exceeded. In this way, the pre-determined range of pressure can be maintained.

Preferably, the released excess flow of lubricant is supplied to the gearing arrangement and/or lubricant supply. In this way, the cooling and lubrication of the gearing arrangement can be increased at higher lubrication pressures, which typically occur at higher operating speeds of the flywheel and gearing arrangement.

Preferably, the apparatus further comprises a labyrinth arrangement, wherein the first pressure is generated using a vacuum pump, and the labyrinth arrangement is between the housing and vacuum pump and is arranged to capture lubricant to prevent it entering the vacuum pump. In this way, any lubricant that has managed to reach the vacuum port, for example droplets of splashed lubricant, can be captured and redirected to the lubricant reservoir.

Preferably, the seals are lip seals, and the lip of each seal extend towards the drive member.

Preferably, the sealing arrangement seals against the housing via a carrier.

Preferably, the flywheel is configured to rotate at speeds of 10.000 rpm or higher.

Preferably, the intermediate pressure is approximately 0.5 atmospheres.

Preferably, the sealing arrangement is arranged to maintain a pressure difference of approximately 1 atmosphere between its two sides.

BRIEF DESCRIPTION OF THE DRAWINGS

These and other features and advantages of the various embodiments disclosed herein will be better understood with respect to the following description and drawings, in which like numbers refer to like parts throughout, and in which.

Embodiments of the invention will now be described by way of example, with reference to the drawings in which.

DETAILED DESCRIPTION

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

The present embodiments represent the best ways currently known to the applicant of putting the invention into practice, but they are not the only ways in which this can be achieved. They are illustrated, and they will now be described, by way of example only.

Figure 1:
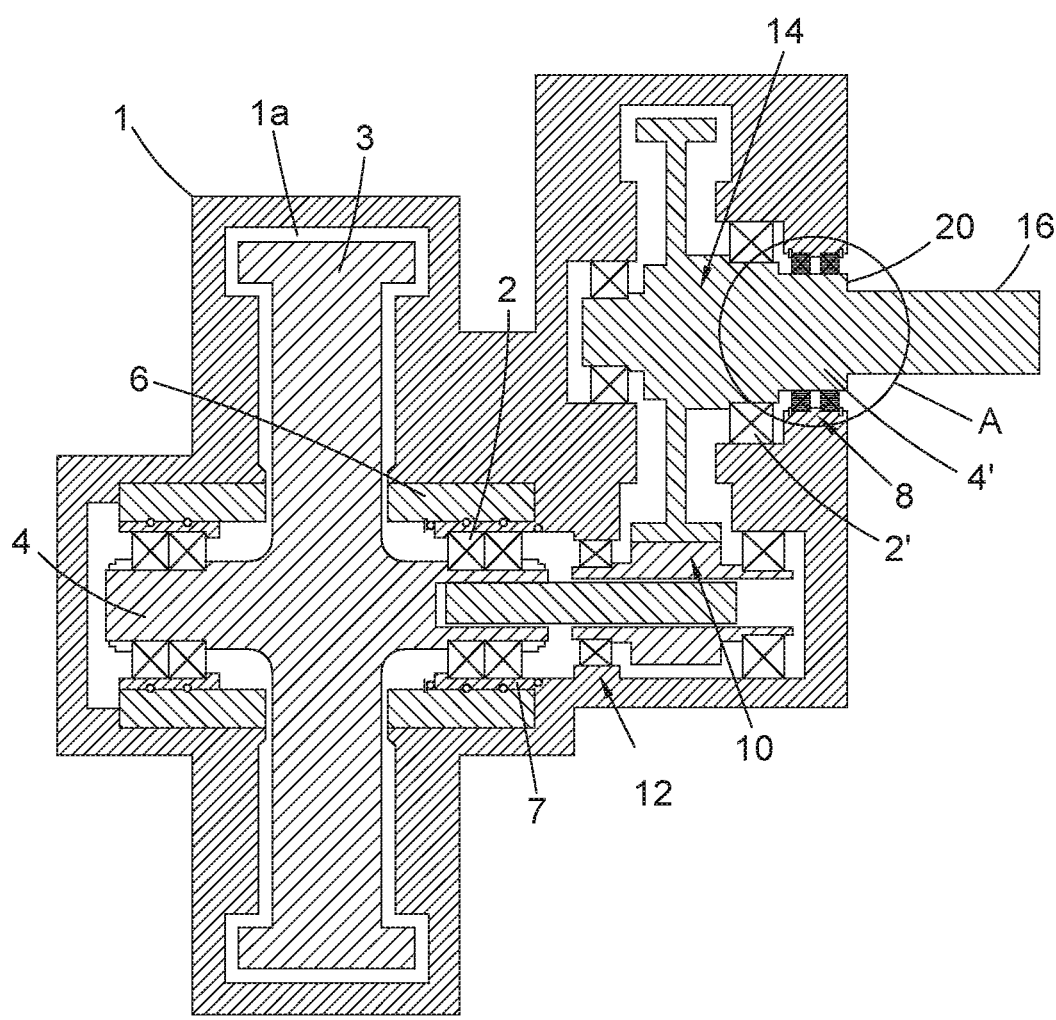
FIG. 1 schematically illustrates in cross section a flywheel apparatus according to an embodiment of the invention.

With reference to FIG. 1, a flywheel 3 is mounted on a flywheel shaft 4 in an evacuated chamber 1a within a housing 1. The flywheel 3 is mounted on the flywheel shaft 4 such that the flywheel 3 and the flywheel shaft 4 can move (in particular, rotate) substantially together, generally as one mass. The flywheel 3 and the flywheel shaft 4 may, for example, be integrally formed as a single component or may be formed as separate components. The flywheel 3 illustrated by FIG. 1 is of a cross section of a flywheel from a view above the longitudinal axis of the flywheel shaft 4.

The flywheel shaft 4 passes through an aperture of a touchdown ring and bearing carrier support 6 (see central portion of FIG. 1). The flywheel shaft 4 is mounted on a carrier 7 via a bearing arrangement 2. The carrier 7 is mounted on the touchdown ring and bearing carrier support 6.

The bearing arrangement is mounted on the carrier 7 and constrained, such that it is substantially fixed in position relative to the carrier 7. The bearing arrangement may move axially substantially together with the carrier 7. The carrier 7 and the bearing arrangement may also or alternatively move radially (i.e. in a direction substantially along a radial line of the flywheel shaft 4) substantially together.

A similar carrier and bearing arrangement exists on the opposing side of the flywheel 3 (see left-hand side of FIG. 1).

A gearing arrangement 10 is mounted within the housing 1 on the flywheel shaft 4. The gearing arrangement 10 has a first end 12, proximal to the flywheel shaft 4, and an opposing second end 14. The first end 12 of the gearing arrangement is in torque transmitting engagement with the flywheel shaft 4. For example, the first end 12 could also be a shaft that is in torque transmitting engagement with the flywheel shaft 4 via an interlinking splined member, or the first end could be a gear that is in direct torque transmitting engagement with the flywheel shaft 4. Alternatively, the first end 12 could be a shaft that is integral with the flywheel shaft 4. The first end 12 may be any such suitable arrangement that allows the gearing arrangement 10 to be in torque transmitting engagement with the flywheel shaft 4.

The second end 14 of the gearing arrangement 10 is arranged to connect the gearing arrangement 10 to a neighbouring drive system 16, such as a flywheel drive transmission (that may include a CVT or a Clutched Flywheel Transmission), such that it is in torque transmitting engagement with the neighbouring drive system 16. The neighbouring drive system 16 may itself be operatively coupled to a vehicle prime mover, a final drive or a part of the transmission between the two. Alternatively, it may be another energy source/sink for example, coupled via an electric or hydraulic motor/generator.

In this embodiment, the second end 14 is a gearing shaft 4'. The gearing shaft 4' is splined and/or comprises a keyway, and able to receive a splined member and/or key from the neighbouring drive system 16 to allow a torque coupling between the gearing arrangement 10 and drive system 16. In this way, the flywheel 3 is able to be torque coupled to the drive system 16 via the gearing arrangement 10. Alternatively, the second end 14 could be a shaft that is not splined and is instead integral with a shaft of the drive system 16. The second end 14 may be any such suitable arrangement that allows the gearing arrangement 10 to be in torque transmitting engagement with the drive system 16.

The gearing arrangement 10 comprises elements constituting the transmission mechanism of the flywheel 3, such as a gear train, to allow torque coupling between the flywheel 3 and the neighbouring drive system 16 via a desired speed ratio coupling. For example, the gearing arrangement 10 may be an epicyclic gear train. The first and second end 12, 14 of the gearing arrangement 10 can be considered as an input and output respectively of the gearing arrangement 10. The gearing shaft 4' is mounted to the housing 1 via a bearing arrangement 2'.

The housing 1 comprises an opening 18. The opening provides an interface between the inside and the outside of the housing 1. The gearing shaft 4' extends from within the housing 1 towards the outside of the housing 1 via the opening 18. The opening 18 has a larger diameter than that of the gearing shaft 4' allowing the gearing shaft 4' to pass through it. The shape of the opening 18 (along a plane substantially parallel to the longitudinal axis of the gearing shaft 4') may substantially correspond to the shape of the gearing shaft 4'. Alternatively, the shape of the opening 18 may not correspond to the shape of the gearing shaft 4'.

The end 20 of the gearing shaft 4' distal from the gearing arrangement 10 coincides with the opening 18 proximal to the outside the housing 1. In some cases, the shaft end 20 coincides with the opening 18 proximal to the gearing arrangement 10, and in other cases, the shaft end 20 protrudes slightly to outside of the housing 1 via the opening 18.

Figure 2:
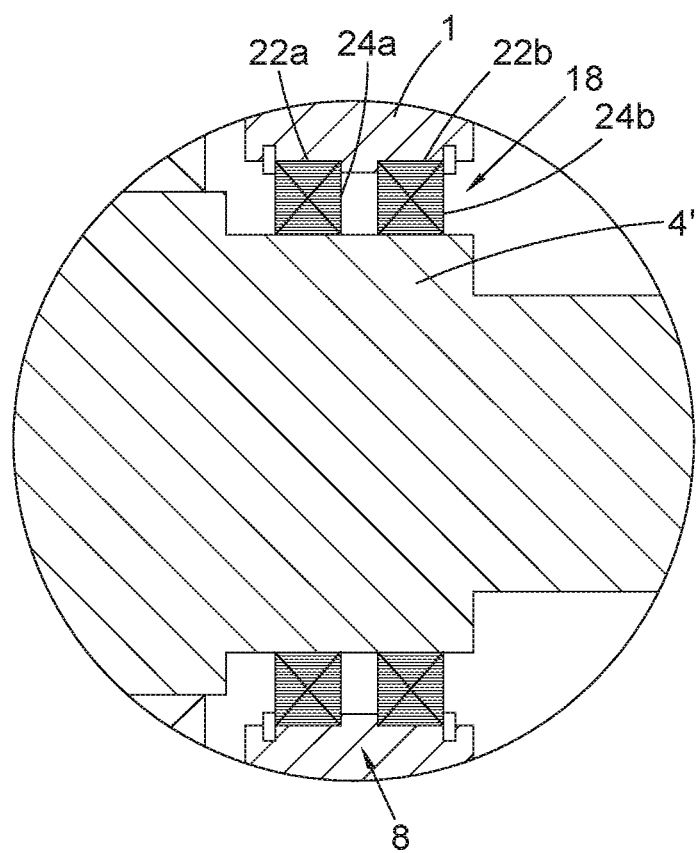
FIG. 2 schematically illustrates in detail a portion A of the cross section of FIG. 1 showing the sealing arrangement.

As illustrated by FIG. 2, a sealing arrangement 8 is mounted in the opening 18 of the housing 1 via a seal carrier (not shown). The sealing arrangement 8 is contained, axially, within the opening 18. The seal carrier is mounted to the housing 1 at the opening 18, and substantially surrounds the opening 18, in particular the space where the opening meets the housing 1. In some cases, the seal carrier is integral with the housing 1. In other cases, there may be no seal carrier and the sealing arrangement 8 is mounted directly to the opening 18 of the housing 1.

The sealing arrangement 8 includes a first seal 22a and a second seal 22b which contact or nearly contact the gearing shaft 4' and which are positioned slightly apart from one another along the axis of the gearing shaft 4', so that the two seals 22a, 22 are coaxial and define a cavity between the seals 22a, 22b along the axis of the gearing shaft 4'.

In the illustrated examples, the seals 22a, 22b are lip seals, though other types of seals may be used. The seals 22a, 22b substantially contact the gearing shaft 4', so that the seals 22a, 22b seal against the gearing shaft 4'. An outer surface of the sealing arrangement 8 is an interference fit with, and forms a seal with, an internal surface of seal carrier. In some cases, the seals 22a, 22b are not in contact with the gearing shaft 4' and seal against the gearing shaft 4' using a thin layer of film of fluid between the seals 22a, 22b and the gearing shaft 4'.

As discussed above, a cavity is defined between the seals 22a, 22b. The seals 22a, 22b define the axial boundaries of the cavity, i.e. the seals 22a, 22b define how far along a line parallel to the axis of the gearing shaft 4' the cavity extends. The gearing shaft 4' defines an inner radial boundary of the cavity, i.e. the gearing shaft 4' demarcates the inner boundary of the cavity in a radial direction of the gearing shaft 4'. A circumferential wall (e.g. a wall of the seal carrier) defines an outer radial boundary of the cavity, i.e. the circumferential wall demarcates the outer boundary of the cavity in the radial direction of the gearing shaft 4'.

The seals 22a, 22b and the cavity extend circumferentially around the gearing shaft 4', so that they encircle the shaft. The seals 22a, 22b and the cavity are positioned and extend in planes roughly orthogonal to the axis of the gearing shaft 4'.

The cavity is arranged such that it can be at least partially filled with a sealing fluid. The sealing fluid may be any suitable liquid or gas that prevents fluid(s) from the flywheel system mixing with fluid(s) from the drive system 16. In this way, the flywheel system is sealed, preventing air from entering the system. In the illustrated example, the cavity is filled with an oil that acts as the sealing fluid. The sealing fluid also serves the purpose of removing heat from the seals, keeping the seals cool. The seals 22a, 22b are arranged such that they retain the sealing fluid within the cavity, or retain as much of the sealing fluid as possible within the cavity.

Depending on the geometry of the wall that demarcates the outer radial boundary of the cavity, the cavity may be annular in cross section, with a circular outer radial boundary. In the illustrated example, the cavity is concentric with the gearing shaft 4'. However, in other examples, the cavity and the gearing shaft 4' may be eccentric.

Each of the seals 22a, 22b has a corresponding lip portion 24a, 24b. The seals 22a, 22b are orientated such that lip portions 24a, 24b face outwardly, with respect to gearing arrangement 10, and extend towards to the outside of the housing 1. In particular, the lip portion 24a of the first seal 22a extends axially towards the second seal 22b, and the lip portion 24b of the second seal 22b extends axially towards the outside of the housing 1.

The seals 22a, 22b, in combination with the sealing fluid, are arranged to prevent ingress of fluids (e.g. air, lubricant) and other matter into the chamber 1a within the housing 1.

A vacuum pump is arranged to maintain a low (close to vacuum) pressure Pc within the chamber 1a of the housing 1. The seals 22a, 22b and sealing fluid help in maintaining the low pressure Pc on the gearing arrangement side of the sealing arrangement 8, within the chamber 1a.

The sealing arrangement 8 is arranged to maintain a pressure difference between its two sides, i.e. between the vacuum side of the sealing arrangement 8, within the chamber 1a, and the atmosphere side of the sealing arrangement 8, outside of the chamber 1a. Preferably, the pressure difference is approximately 1 atmosphere. The sealing arrangement 8 may form a hermetic seal against the gearing shaft 4'. Thus, the sealing arrangement 8 helps to ensure the chamber 1 within the housing is substantially hermetically sealed.

In the case where the seals 22a, 22b do not contact the gearing shaft 4', the thin layer or film of fluid is between the lip portions 24a, 24b of the seals 22a, 22b and the gearing shaft 4', and may ensure that the hermetic seal is formed.

Having the lip portions 24a, 24 of the seals 22a, 22b configured in the above described way allows the pressure of the sealing fluid within the cavity of the seals 22a, 22b to be maintained at an intermediate pressure Ps, between the pressure Pc within the chamber 1 and the ambient atmospheric pressure, i.e. the pressure outside of the chamber 1.

Preferably, the intermediate pressure Ps, of the sealing fluid, is maintained at approximately 0.5 atmospheres. In this way, a relatively low pressure delta is maintained across each of the seals 22a, 22b, for example when compared to the pressure delta across the seals of a sealing arrangement that is maintained at a pressure above atmospheric pressure. Maintaining a relatively low pressure delta across the seals 22a, 22b helps to increase the life of the seals, when compared with the life of seals having a higher pressure delta being maintained across them.

The seals 22a, 22b may be polymeric seals such as polyimide seals or rubber seals, some examples of the types of rubber being Nitrile Rubber (NBR), Hydrogenated Nitrile (HNBR), and Fluoroelastomer (FKM). The seals 22a, 22b may include polytetrafluoroethylene (PTFE), graphite, molybdenum disulphide and/or other materials. In some examples, the seals 22a, 22b may be magnetic liquid rotary seals or mechanical face or shaft seals.

Figure 3:
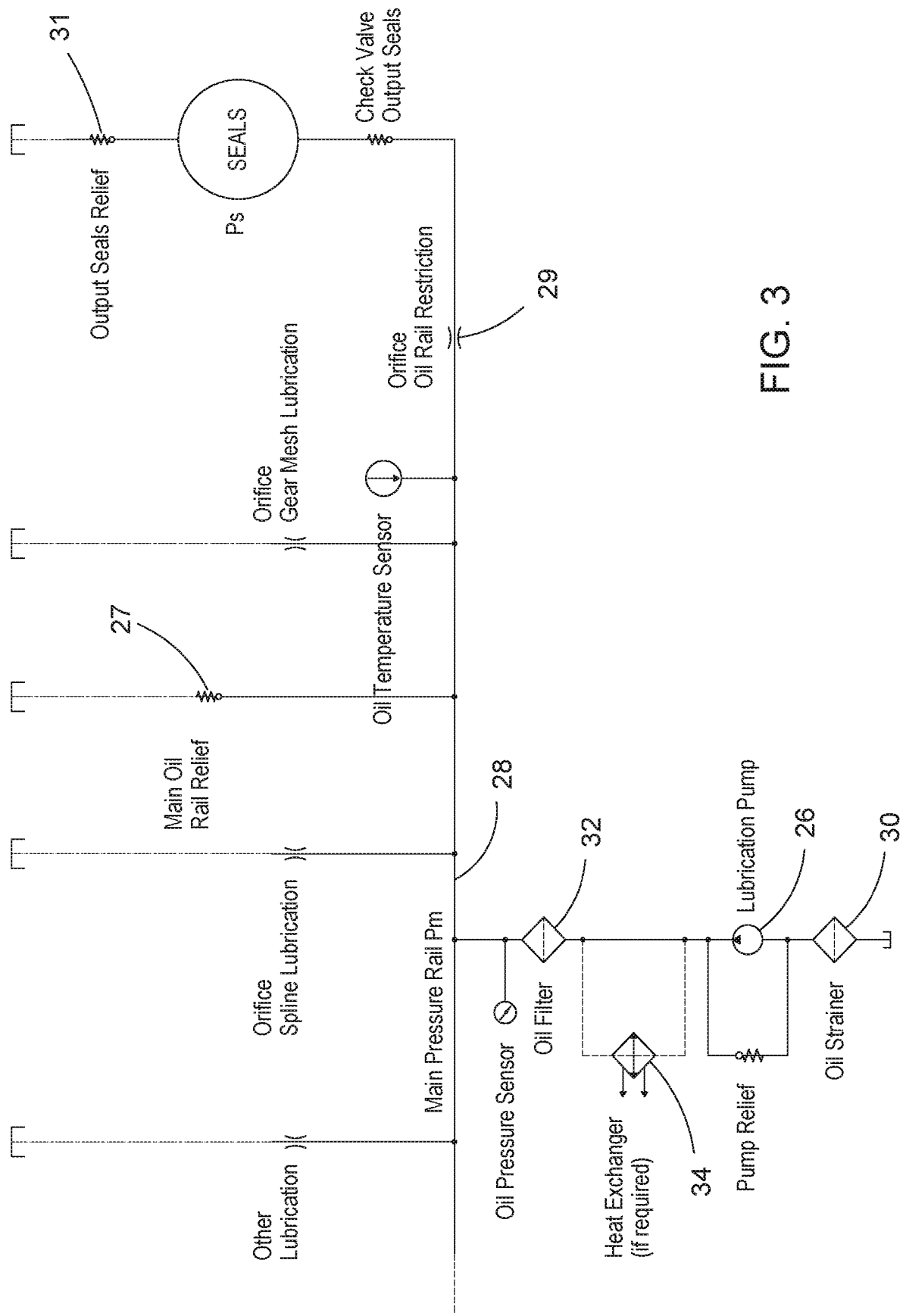
FIG. 3 is a schematic illustrating the lubricant flow control system.

As illustrated by FIG. 3, lubricant from a lubricant reservoir (not shown) is arranged to be delivered to the bearing arrangements 2, 2', the sealing arrangement 8 and the gearing arrangement 10 using a pump 26. Preferably, the pump 26 is driven directly by either the gearing arrangement 10 or the flywheel 3. In the case where the pump 26 is driven directly by the gearing arrangement 10, the pump is rotatably coupled to a rotating element of the gearing arrangement 10, for example a drive gear. Integrating the pump 26 within the chamber 1a such that it is driven directly from either the gearing arrangement 10 or the flywheel 3 allows for a more compact and relatively less complex system design. Alternatively, the pump 26 may be driven by an electric motor.

The lubricant flow delivered to the bearing arrangements 2, 2', the sealing arrangement 8 and the gearing arrangement 10 is managed by controlling the pressure Pm of a main lubricant rail 28. The pressure Pm of the main lubricant rail 28 is generally limited by the main oil rail relief valve 27 and is maintained within a pre-determined range above the low pressure Pc created within the chamber 1a. The pressure Ps of lubricant delivered to cavity of the seals 22a, 22b is maintained at a pressure lower than the main lubricant rail pressure Pm and above the low pressure Pc within the chamber 1a such that:

$$Pm > Ps > Pc$$

Maintaining the pressure Pm within a pre-determined range above the low pressure Pc created within the chamber 1a ensures a consistent flow of lubricant is delivered to the bearing and gearing arrangements over a wide range of operating speeds of the gearing arrangement 10 and flywheel 3. Maintaining the pressure Ps of lubricant delivered to the seals 22a. 22b below Pm ensures good reliability of the sealing ability of the sealing arrangement 8 despite drops in pressure on the main lubricant rail 28.

In particular, the flow of lubricant delivered to the cavity of the seals 22a, 22b is controlled, for example using a restrictor 29, such that the lubricant flowrate is maintained in a controlled range at normal operating speeds of the flywheel 3. Further, the pressure difference between Pc and Ps is maintained at approximately a fixed value, for example using a check valve 31 or pressure relief valve, at normal operating speeds of the flywheel.

'Normal' operating speeds of the flywheel 3 are speeds above 10% of the flywheel 3 charge, which is approximately 30% of the maximum speed of the flywheel.

The maximum pressure of the pre-determined pressure range for Pm is controlled such that if the pressure exceeds the maximum pressure, lubricant is permitted to flow away from the main lubricant rail 28 until the pressure returns to below the maximum pressure of the pre-determined range. The skilled person will understand that a check valve may be used to achieve this. This 'excess flow' of lubricant can optionally be directed onto the gearing arrangement 10 to increase the cooling and lubrication of the gearing arrangement 10 at higher lubrication pressures which typically occur at higher operating speeds of the flywheel 3 and gearing arrangement 10. Alternatively, the excess flow of lubricant can be directed towards the lubricant reservoir or returned to the inlet of the pump.

At the inlet of the pump 26, a strainer 30 prevents ingress of debris into the pump 26, and at the outlet of the pump 26, a filter 32 prevents ingress of relatively smaller debris, not captured by the strainer 30, from being delivered to the bearing arrangements 2, 2', the scaling arrangement 8 and the gearing arrangement 10. Optionally, a heat exchanger 34 may help regulate the temperature of the lubricant being delivered.

A direct pathway between the lubricant reservoir and the inlet of the pump 26 mitigates any potential pressure drop that might occur to the inlet of the pump 26, due to a partial vacuum and/or partial blockage at the inlet, decreasing the likelihood of cavitation of the pump 26—the direct pathway maximises the lubricant pressure at the inlet of the pump 26. The strainer 30 described above is mounted on this direct pathway. Although the low pressure Pc is close to vacuum pressure, the pressure Pc is high enough such that cavitation of the pump 26 is mitigated.

The vacuum pump is coupled to the chamber 1a via a vacuum port (not shown). The vacuum port is proximal to the flywheel 3, as no lubricant is directly exhausted onto the flywheel 3. Thus, any lubricant inadvertently entering the vacuum pump, for example by splashing of the lubricant, is mitigated.

Figure 4:
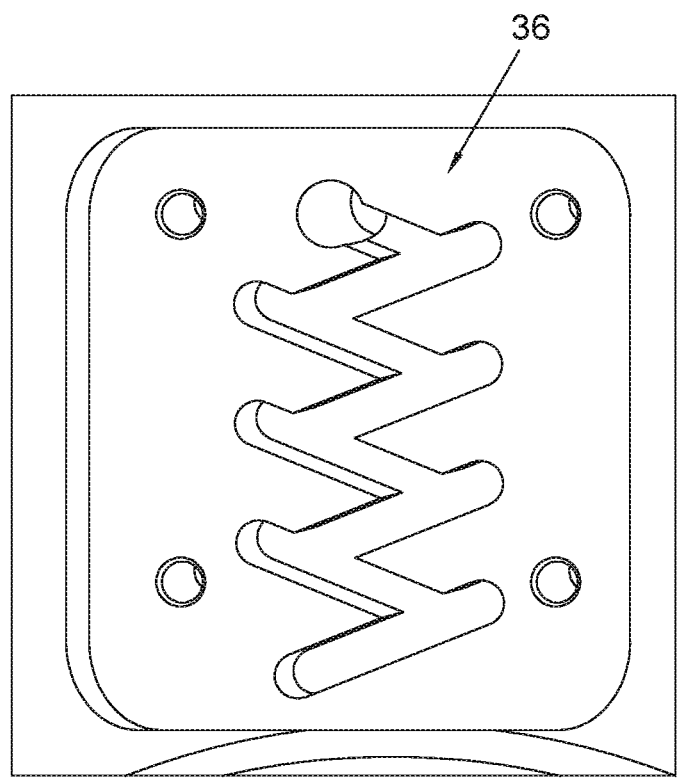
FIG. 4 is a perspective view of a labyrinth sealing arrangement.

As illustrated by FIG. 4, a labyrinth arrangement 36 is mounted at the inlet of the vacuum port, i.e. a passage of the vacuum port coupled to the chamber 1a, and captures any lubricant that has managed to reach the vacuum port, for example droplets of splashed, and redirects the captured lubricant to the lubricant reservoir. The labyrinth arrangement 36 is arranged to seal the chamber 1a when the vacuum pump in not in operation, for example using a check valve between the labyrinth arrangement 36 and the vacuum port.

In the illustrated example, lubricant is used as the sealing fluid. The lubricant might for instance be a gear oil, an automatic transmission fluid, or a continuously variable transmission fluid such as a traction fluid which may be used in the case of a traction drive.

In some examples, the lubricant may be a low-viscosity oil. The oil may for example have a kinematic viscosity of between approximately 5 mm$^2$ s$^{-1}$ and 15 mm$^2$ s$^{-1}$ at a working temperature of the flywheel apparatus. Low-viscosity oil may advantageously reduce drag in the scaling arrangements.

Any sealing fluid which leaks past sealing arrangement 8, closest to the gearing arrangement 10, out of the cavity and into the chamber 1a is directed towards and gathered at the lubricant reservoir before being returned directly to the pump 26.

Having the elements which constitute the transmission of the flywheel 3, i.e. the gearing arrangement 10, operate at a low (close to vacuum) pressure, alongside the flywheel 3 is advantageous for several reasons. In particular, kinetic losses of the gearing arrangement 10 due to windage is drastically reduced, as any high operating speeds of the gearing arrangement are substantially no longer impeded by air resistance. As the gearing arrangement 10 is in torque transmitting engagement with the flywheel 3, reduced windage losses of the gearing arrangement 10 results in correspondingly less kinetic losses in the flywheel, as less attenuation of the rotational speeds of the flywheel 3 occurs.

Thus, when compared to conventional systems with a flywheel having its associated transmission outside of its evacuated chamber, for the same rotational speed of the flywheel 3, relatively lower operating speeds of the gearing arrangement 10 are required, resulting in lower rotational speeds of the output of the transmission, i.e. the gearing shaft 4'.

Having the gearing arrangement 10 within the chamber 1a allows implementation of a simpler lubrication system that requires fewer sealing arrangements, as only the output of the transmission, i.e. the gearing shaft 4', is required to be sealed, reducing sealing losses incurred when compared to conventional systems comprising a plurality of sealing arrangements. This arrangement further reduces sealing losses due to friction, as the sliding speed of the seal on the gearing shaft 4 is reduced relative to conventional systems having a sealing arrangement on a relatively high speed output shaft.

In a second embodiment, the seals 22a, 22b are orientated such that lip portions 24a, 24b face towards one another. In particular, the lip portion 24a of the first seal 22a extends axially towards the second seal 22b, and the lip portion 24b of the second seal 22b extends axially towards the first seal 22a. Having the lip portions 24a, 24 of the seals 22a, 22b configured in this way allows the pressure Ps of the sealing fluid within the cavity of the seals 22a, 22b to be maintained at a pressure equal to or above the ambient atmospheric pressure, i.e. the pressure outside of the chamber 1.

The invention claimed is:

1. An apparatus comprising:
   a flywheel mounted on a flywheel shaft;
   a bearing arrangement on which the flywheel shaft is supported;
   a gearing arrangement for torque coupling the flywheel to a drive system;
   a sealing arrangement; and
   a housing for containing the flywheel, bearing and gearing arrangements, the gearing arrangement being arranged to be in torque transmitting engagement with the flywheel, via the flywheel shaft, and having an engagement means for being in torque transmitting engagement with the drive system,
   the sealing arrangement comprising a pair of seals, defining a cavity, and being arranged to form a hermetic seal, between the engagement means and the housing, hermetically sealing the housing,
   whereby, in use, a first pressure is maintained within the housing that is lower than a second pressure outside of the housing, and the seals are configured to retain a fluid within the cavity, and are arranged to maintain the fluid at an intermediate pressure between the first and the second pressure.

2. An apparatus according to claim 1, wherein the engagement means is a gear shaft supported by a second bearing arrangement and arranged to be in torque transmitting engagement with the gearing arrangement.

3. An apparatus according to claim 2, wherein the seals and the cavity extend circumferentially around the gear shaft.

4. An apparatus according to claim 1, wherein a pump circulates lubricant, from a lubricant supply, to the gearing and bearing arrangements and is driven directly by the gearing arrangement, the flywheel or an electric motor.

5. An apparatus according to claim 4, wherein a lubricant pressure at the outlet of the pump is maintained within a pre-determined range above the first pressure.

6. An apparatus according to claim 4, wherein the lubricant pressure at the inlet of the pump is maximised using a direct path from the lubricant supply to the inlet of the pump.

7. An apparatus according to claim 4, wherein an excess flow of lubricant is arranged to be released to ensure the maximum pressure of the pre-determined range is not exceeded.

8. An apparatus according to claim 7, wherein the released excess flow of lubricant is supplied to the gearing arrangement and/or lubricant supply.

9. An apparatus according to claim 1, further comprising a labyrinth arrangement, wherein the first pressure is generated using a vacuum pump, and the labyrinth arrangement is between the housing and vacuum pump and is arranged to capture lubricant to prevent it entering the vacuum pump.

10. An apparatus according to claim 1, wherein the seals are lip seals, and the lip of each seal extend towards the drive system.

11. An apparatus according to claim 1, wherein the sealing arrangement seals against the housing via a carrier.

12. An apparatus according to claim 1, wherein the flywheel is configured to rotate at speeds of 10,000 rpm or higher.

13. An apparatus according to claim 1, wherein the intermediate pressure is 0.5 atmospheres.

14. An apparatus according to claim 1, wherein the sealing arrangement is arranged to maintain a pressure difference of 1 atmosphere between its two sides.

15. An apparatus comprising:
    a flywheel mounted on a flywheel shaft;
    a bearing arrangement on which the flywheel shaft is supported;
    a gearing arrangement for torque coupling the flywheel to a drive system;
    a sealing arrangement; and
    a housing for containing the flywheel, bearing and gearing arrangements, the gearing arrangement being arranged to be in torque transmitting engagement with the flywheel, via the flywheel shaft, and having an engagement means for being in torque transmitting engagement with the drive system,
    the sealing arrangement comprising a pair of seals, defining a cavity, and being arranged to form a hermetic seal, between the engagement means and the housing, hermetically sealing the housing,
    whereby, in use, a first pressure is maintained within the housing that is lower than a second pressure outside of the housing, and the seals are configured to retain a fluid within the cavity, and are arranged to maintain the fluid at a pressure equal to or above the second pressure.

* * * * *